US011887399B2

(12) United States Patent
Choe et al.

(10) Patent No.: US 11,887,399 B2
(45) Date of Patent: Jan. 30, 2024

(54) BIOMETRIC INFORMATION DETECTING DEVICE AND DISPLAY APPARATUS HAVING THE SAME

(71) Applicant: Samsung Display Co., Ltd., Yongin-Si (KR)

(72) Inventors: Weonjun Choe, Hwaseong-si (KR); Hai-jung In, Seoul (KR); Jinwoo Kim, Hwaseong-si (KR); Hyoungwook Jang, Uiwang-si (KR)

(73) Assignee: Samsung Display Co., Ltd., Yongin-Si (KR)

(*) Notice: Subject to any disclaimer, the term of this patent is extended or adjusted under 35 U.S.C. 154(b) by 26 days.

(21) Appl. No.: 16/132,127

(22) Filed: Sep. 14, 2018

(65) Prior Publication Data

US 2019/0087628 A1 Mar. 21, 2019

(30) Foreign Application Priority Data

Sep. 15, 2017 (KR) .................. 10-2017-0118871

(51) Int. Cl.
*G06V 40/13* (2022.01)
*G06V 40/12* (2022.01)

(52) U.S. Cl.
CPC ...... *G06V 40/1318* (2022.01); *G06V 40/1306* (2022.01); *G06V 40/1335* (2022.01); *G06V 40/1365* (2022.01)

(58) Field of Classification Search
None
See application file for complete search history.

(56) References Cited

U.S. PATENT DOCUMENTS

| 6,023,522 | A | * | 2/2000 | Draganoff | .............. | G06V 40/13 |
| | | | | | | 382/270 |
| 6,259,804 | B1 | * | 7/2001 | Setlak | .................. | G06K 9/0002 |
| | | | | | | 382/124 |
| 9,727,770 | B2 | | 8/2017 | Gozzini et al. | | |
| 9,829,614 | B2 | | 11/2017 | Smith et al. | | |

(Continued)

FOREIGN PATENT DOCUMENTS

KR 10-2017-0058258 A 5/2017

OTHER PUBLICATIONS

"An Adaptive Fingerprint-Sensing Scheme for a User Authentication System with a Fingerprint Sensor LSI" by Hiroki Morimura et al. May 2004 10 pages.

(Continued)

*Primary Examiner* — Benjamin X Casarez
(74) *Attorney, Agent, or Firm* — Innovation Counsel LLP

(57) ABSTRACT

A biometric information detecting device includes a measurer, a determiner, a controller, and a processor. The measurer measures biometric information of a user as an electrical signal. The determiner is connected to the measurer to receive the electrical signal, processes the electrical signal according to a first reference condition to output a first result signal, and processes the electrical signal according to a second reference condition to output a second result signal. The controller controls the determiner such that the determiner is operated in the first reference condition or the second reference condition, and the processor processes the first and second result signals to obtain the biometric information of the user.

25 Claims, 13 Drawing Sheets

(56) References Cited

U.S. PATENT DOCUMENTS

| | | | |
|---|---|---|---|
| 2002/0146156 A1* | 10/2002 | Morimura | G06K 9/00013 |
| | | | 382/124 |
| 2006/0056700 A1* | 3/2006 | Abiko | G06V 40/1306 |
| | | | 382/190 |
| 2006/0285728 A1 | 12/2006 | Leung et al. | |
| 2013/0294662 A1* | 11/2013 | Franza | G06K 9/0002 |
| | | | 382/124 |
| 2014/0003678 A1* | 1/2014 | Vieta | G06K 9/00026 |
| | | | 382/124 |
| 2014/0267659 A1 | 9/2014 | Lyon et al. | |
| 2015/0023571 A1* | 1/2015 | Gozzini | G06K 9/00067 |
| | | | 382/124 |
| 2015/0199552 A1* | 7/2015 | Du | G06K 9/4642 |
| | | | 382/124 |
| 2016/0078274 A1 | 3/2016 | Tuneld et al. | |
| 2016/0224816 A1* | 8/2016 | Smith | G02B 27/58 |
| 2017/0017824 A1 | 1/2017 | Smith et al. | |
| 2017/0344795 A1* | 11/2017 | Zhou | G06F 21/32 |
| 2018/0005030 A1* | 1/2018 | Jiang | G06K 9/00013 |
| 2018/0121702 A1* | 5/2018 | Kim | G06V 40/67 |
| 2018/0137327 A1* | 5/2018 | Riedijk | G06V 40/1347 |
| 2018/0225495 A1* | 8/2018 | Jonsson | G06V 40/1329 |
| 2019/0056810 A1* | 2/2019 | Mai | G06K 9/40 |
| 2019/0087559 A1* | 3/2019 | Zhou | G06V 40/1376 |

OTHER PUBLICATIONS

"A CMOS-Only Micro Touch Pointer" by Nicolo Manaresi et al. Dec. 1999 10 pages.

* cited by examiner

BIOMETRIC INFORMATION DETECTING DEVICE AND DISPLAY APPARATUS HAVING THE SAME

CROSS-REFERENCE TO RELATED APPLICATION

This U.S. non-provisional patent application claims priority under 35 U.S.C. § 119 of Korean Patent Application No. 10-2017-0118871, filed on Sep. 15, 2017, the disclosure of which is hereby incorporated by reference in its entirety.

BACKGROUND

1. Field of Disclosure

The present disclosure relates to a biometric information detecting device and a display apparatus having the same. More particularly, the present disclosure relates to a biometric information detecting device capable of accurately recognizing biometric information and a display apparatus capable of recognizing a biometric information.

2. Description of the Related Art

In recent years, display apparatuses that can sense biometric information of users have been widely used. Various methods of recognizing the biometric information can be used. A capacitance method recognizes the biometric information based on a variation in capacitance of a capacitor formed between electrodes, an optical method recognizes the biometric information using an optical sensor, and an ultrasonic method recognizes the biometric information using a piezoelectric material.

Sometimes, however, the biometric information is sensed incorrectly due to external environment conditions. Particularly, in the case of a fingerprint sensor, a ridge and a valley of a fingerprint are not accurately recognized depending on a contact state and condition of the finger.

SUMMARY

The present disclosure provides a biometric information detecting device with improved biometric information recognition rate.

The present disclosure provides a display apparatus having the biometric information detecting device with the improved biometric information recognition rate.

Embodiments of the inventive concept provide a biometric information detecting device including a measurer measuring biometric information of a user as an electrical signal, a determiner connected to the measurer to receive the electrical signal, processing the electrical signal according to a first reference condition to output a first result signal, and processing the electrical signal according to a second reference condition to output a second result signal, a controller controlling the determiner such that the determiner is operated in the first reference condition or the second reference condition, and a processor processing the first and second result signals to obtain the biometric information of the user.

The determiner includes an analog-to-digital converter that converts the electrical signal in an analog form to a digital signal based on a predetermined reference range.

The analog-to-digital converter converts the electrical signal to the first result signal in a digital form based on a first predetermined reference range when the analog-to-digital converter is operated in the first reference condition and converts the electrical signal to the second result signal in a digital form based on a second predetermined reference range when the analog-to-digital converter is operated in the second reference condition.

The controller outputs a first reference signal to the analog-to-digital converter to set the reference range of the analog-to-digital converter to the first reference range and outputs a second reference signal to the analog-to-digital converter to set the reference range of the analog-to-digital converter to the second reference range.

The first reference range is defined between a first reference voltage and a second reference voltage, the second reference range is defined between a third reference voltage and a fourth reference voltage, and the second reference range is included in the first reference range.

The analog-to-digital converter includes a first analog-to-digital converter operated in the first reference condition to convert the electrical signal to the first result signal in the digital form according to a first predetermined reference range and a second analog-to-digital converter operated in the second reference condition to convert the electrical signal to the second result signal in the digital form according to a second predetermined reference range.

The controller outputs a first reference signal to the first analog-to-digital converter to allow the first analog-to-digital converter to be operated in the first reference condition and outputs a second reference signal to the second analog-to-digital converter to allow the second analog-to-digital converter to be operated in the second reference condition.

The determiner further includes an amplifier that amplifies the electrical signal output from the measurer to output an amplified signal.

The amplifier amplifies the electrical signal according to a first predetermined gain when operated in the first reference condition to output a first amplified signal and amplifies the electrical signal according to a second predetermined gain when operated in the second reference condition to output a second amplified signal.

The controller applies a control signal to the amplifier such that the amplifier amplifies the electrical signal based on different gains from each other according to the first and second reference conditions.

The second predetermined gain may be greater than the first predetermined gain.

The analog-to-digital converter converts the first amplified signal to the first result signal in a digital form according to the reference range on the first reference condition and converts the second amplified signal to the second result signal in a digital form according to the reference range on the second reference condition.

The processor includes a synthesizer synthesizing the first result signal and the second result signal to output a final result signal and a processor processing the final result signal to obtain the biometric information of the user.

The measurer includes a sensing device that receives a light reflected by the user's finger and outputs fingerprint information of the user as the electrical signal based on an amount of the reflected light.

Embodiments of the inventive concept provide a display apparatus including a display panel displaying an image and a biometric information detecting device recognizing biometric information of a user that is input through the display panel.

The biometric information detecting device includes a measurer measuring biometric information of the user as an electrical signal, a determiner connected to the measurer to receive the electrical signal, processing the electrical signal according to a first reference condition to output a first result signal, and processing the electrical signal according to a second reference condition to output a second result signal, a controller controlling the determiner such that the determiner is operated in the first reference condition or the second reference condition, and a processor processing the first and second result signals to obtain the biometric information of the user.

According to the above, the measured signal is determined based on different reference conditions from each other, and the determined results are synthesized to obtain the biometric information of the user. Accordingly, a recognition rate of the biometric information may be improved.

The display apparatus includes the sensing device built in or attached to the display panel. In addition, the display apparatus determines the signal sensed by the sensing device on different reference conditions from each other and synthesizes the determined results to obtain the biometric information. Thus, the recognition rate of the biometric information may be improved.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
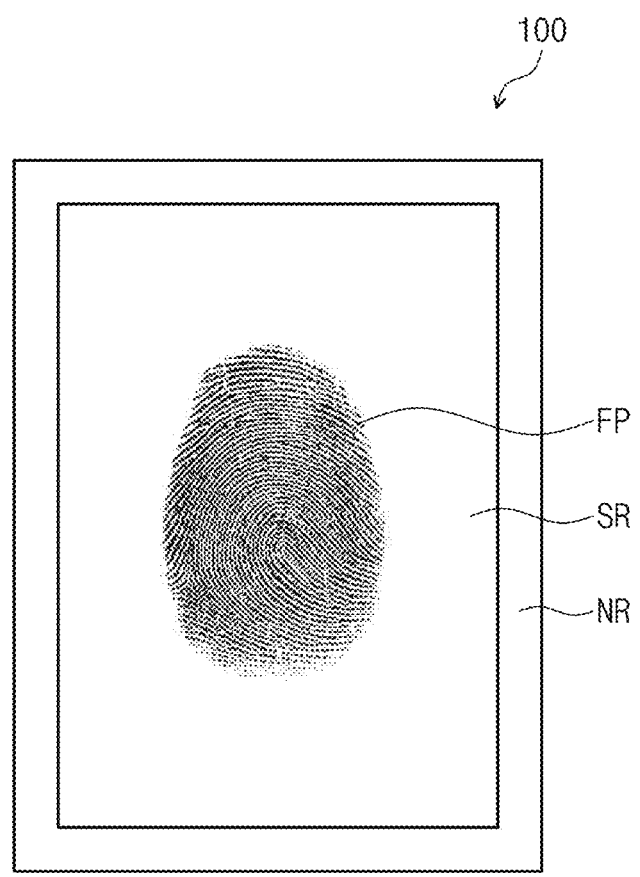
FIG. 1 is a plan view showing a biometric information detecting device according to an exemplary embodiment of the present disclosure.

The present disclosure may be variously modified and realized in many different forms, and thus specific embodiments will be exemplified in the drawings and described in detail hereinbelow. However, the present disclosure should not be limited to the specific disclosed forms and be construed to include various modifications, equivalents, or replacements without deviating from the spirit and scope of the present disclosure.

FIG. 1 is a plan view showing a biometric information detecting device 100 according to an exemplary embodiment of the present disclosure.

Referring to FIG. 1, the biometric information detecting device 100 according to the exemplary embodiment of the present disclosure includes a sensing region SR in which biometric information (e.g., a biometric fingerprint FP) is sensed when a user inputs the biometric information and a peripheral region NR surrounding the sensing region SR. In this case, the peripheral region NR corresponds to an area in which a biometric fingerprint FP is not sensed. For example, the peripheral region NR may be a region in which a frame member providing an edge region of the biometric information detecting device 100 is disposed or a region in which a driving circuit applying a driving signal to the sensing region SR is disposed.

The biometric information detecting device 100 according to the present exemplary embodiment may be, but not limited to, a fingerprint image sensing device that recognizes a user's fingerprint as the biometric information. The biometric information detecting device 100 may recognize an image corresponding to the fingerprint making contact with the sensing region SR.

The sensing region SR may include sensing devices (not shown) arranged therein to sense the fingerprint information. As an example of the present disclosure, the sensing devices may include one of a light receiving device that receives a light, a pressure device that senses a pressure, and a thermal device that senses temperature.

Figure 2:
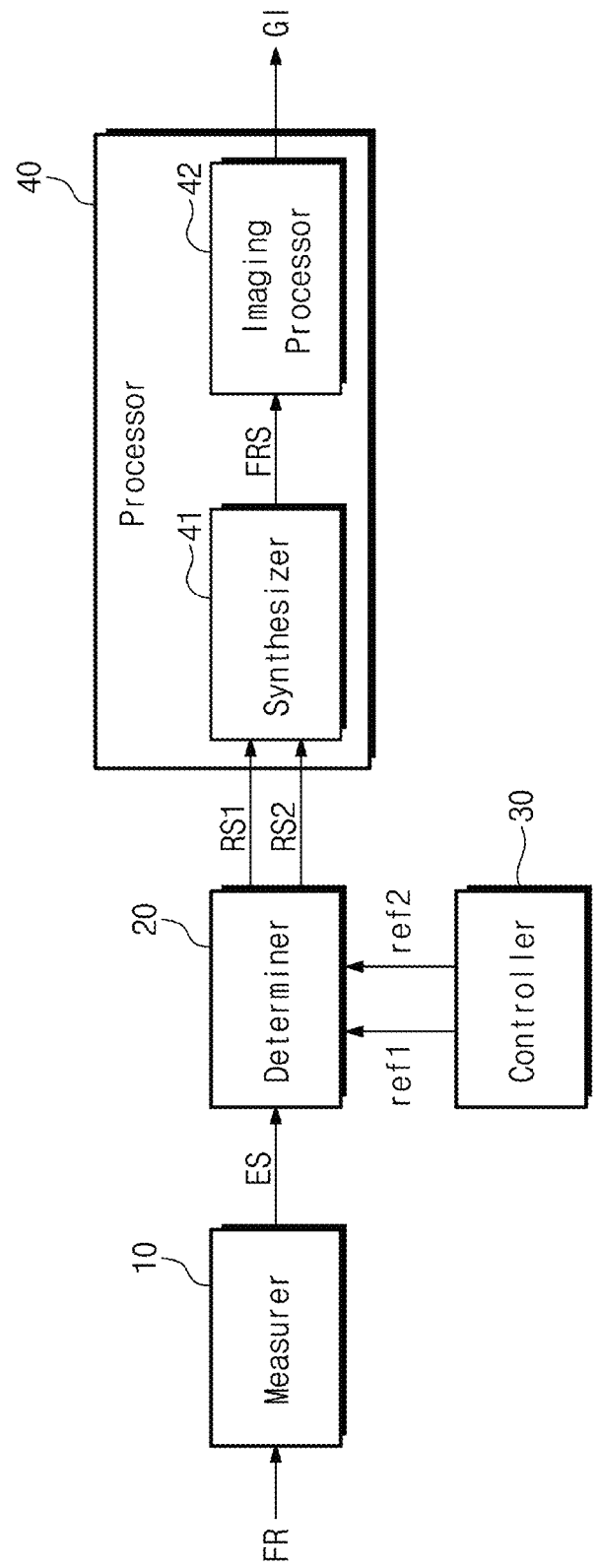
FIG. 2 is a block diagram showing a biometric information detecting device according to an exemplary embodiment of the present disclosure.

FIG. 2 is a block diagram showing the biometric information detecting device 100 (refer to FIG. 1) according to an exemplary embodiment of the present disclosure.

Referring to FIG. 2, the biometric information detecting device 100 (refer to FIG. 1) according to the exemplary embodiment of the present disclosure includes a measurer 10, a determiner 20, a controller 30, and a processor 40.

The measurer 10 includes a plurality of sensing devices to measure the biometric information FR. As an example of the present disclosure, the sensing devices may include one of the light receiving device that receives the light, the pressure device that senses the pressure, and the thermal device that senses the temperature. Accordingly, a signal measured by the measurer 10 may include light intensity, pressure, or temperature information. The measurer 10 converts the biometric information FR measured by the above-mentioned sensing devices to an electrical signal ES and applies the electrical signal ES to the determiner 20.

The determiner 20 is connected to the sensing devices included in the measurer 10 to receive the electrical signal ES including the biometric information FR. The determiner 20 outputs a first result signal RS1 obtained by processing the electrical signal ES according to a first reference condition and a second result signal RS2 obtained by processing the electrical signal ES according to a second reference condition.

The controller 30 controls an operation of the determiner 20. In detail, the controller 30 controls the determiner 20 to process the electrical signal ES on the first reference condition and the second reference condition.

The processor 40 processes the electrical signal ES based on the first and second result signals RS1 and RS2. The biometric information detecting device 100 may be, but not limited to, a fingerprint image sensing device, and in this case, the processor 40 carries out an image processing process to generate a fingerprint image based on the first and second result signals RS1 and RS2. The processor 40 may include a synthesizer 41 and an imaging processor 42. The synthesizer 41 synthesizes the first and second result signals RS1 and RS2 to calculate a final result signal FRS.

The imaging processor 42 may generate the biometric information as a fingerprint image GI based on the final result signal FRS. Although not shown in figures, the biometric information detecting device 100 compares the generated fingerprint image GI to a pre-stored fingerprint image and determines whether the fingerprint image GI matches the pre-stored fingerprint image to authenticate a user. For instance, when the fingerprint image GI matches the pre-stored fingerprint image, an access of the user is allowed, and when the fingerprint image GI does not match the pre-stored fingerprint image, an access of the user is denied.

Figure 3:
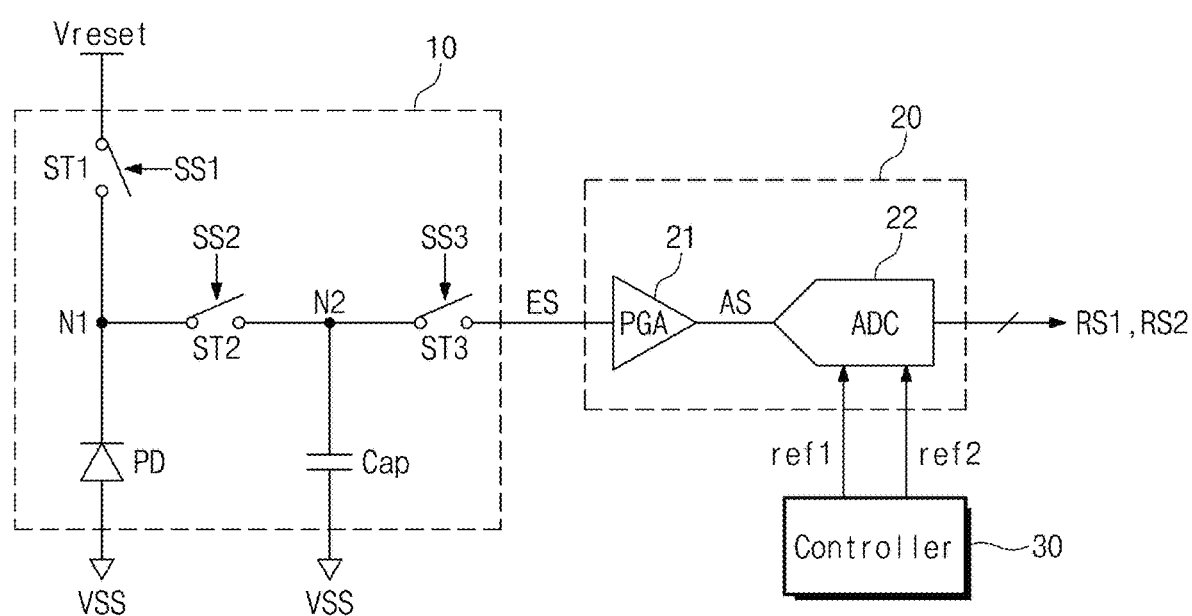
FIG. 3 is a circuit diagram showing configurations of a measurer and a determiner shown in FIG. 2.

FIG. 3 is a circuit diagram showing configurations of the measurer 10 and the determiner 20 shown in FIG. 2.

Referring to FIG. 3, the measurer 10 includes first, second, and third switching devices ST1, ST2, and ST3, a photodiode PD, and a capacitor Cap. The photodiode PD corresponds to one of the above-mentioned sensing devices, and particularly, the photodiode PD may be the light receiving device that receives the light incident thereto after being reflected from a fingerprint of a user.

The first switching device ST1 is connected between an input terminal to which a reset voltage Vreset is input and the photodiode PD. The first switching device ST1 may initialize an electric potential of a first node N1 at which the photodiode PD and the first switching device ST1 are coupled to each other to the reset voltage Vreset in response to a first switching signal SS1 during an initializing period. The first switching device ST1 may be turned off after the initializing period.

The capacitor Cap is disposed between a ground voltage VSS and a second node N2, and the second switching device ST2 is connected to the second node N2 and the first node N1.

The second switching device ST2 is turned on in response to a second switching signal SS2 during a sensing period. When the photodiode PD does not receive the light during the sensing period, the first node N1 is maintained in the reset voltage Vreset, and the capacitor Cap is charged with electric charges corresponding to a difference in voltage between the ground voltage VSS and the reset voltage Vreset.

However, when the photodiode PD receives the light during the sensing period, the photodiode PD is turned on, and the electric potential of the first node N1 is lowered to near the ground voltage VSS. Thus, the electric charges charged in the capacitor Cap may be discharged.

The third switching device ST3 is disposed between the second node N2 and an input terminal of the determiner 20. When the third switching device ST3 is turned on in response to a third switching signal SS3 during a readout period, current flows from the second node N2 to the input terminal of the determiner 20. In this case, an amount of the current flowing to the input terminal of the determiner 20 may be changed depending on the reception of the light.

According to the embodiment of the present disclosure, the determiner 20 includes an amplifier 21 and an analog-to-digital converter (hereinafter, referred to as an "ADC") 22. The amplifier 21 may amplify the electrical signal input to the determiner 20 and may be a programmable gain amplifier (PGA) as a representative example. In case of an optical sensing method that recognizes a user's fingerprint with lights reflected by a ridge and a valley of the user's fingerprint, there may be substantially no difference between the electrical signals output from the measurer 10 since the difference in amount between the light reflected by the ridge and the light reflected by the valley can be very small. Accordingly, to recognize the difference between the electrical signals, the PGA 21 that amplifies the electrical signals ES may be included in the determiner 20. The PGA 21 amplifies the electrical signals ES and outputs an amplified signal AS. The amplified signal AS may have a level that varies depending on a gain of the PGA 21.

The ADC 22 converts the amplified signal AS in an analog form to a digital signal. According to the exemplary embodiment of the present disclosure, the ADC 22 receives a first reference signal ref1 from the controller 30 to convert the amplified signal AS to the digital signal on the first reference condition. In addition, the ADC 22 receives a second reference signal ref2 from the controller 30 to convert the amplified signal AS to the digital signal on the second reference condition. That is, the ADC 22 may convert one input signal to the digital signal on two different conditions.

First, the ADC 22 converts the amplified signal AS to the digital signal on the first reference condition and outputs the first result signal RS1, and then the ADC 22 converts the amplified signal AS to the digital signal on the second reference condition and outputs the second result signal RS2. That is, the ADC 22 may output two result signals RS1 and RS2 with a time interval therebetween, with respect to one input signal.

In the present exemplary embodiment, the PGA 21 may be omitted from the determiner 20. In this case, for the convenience of explanation, the signal input to the ADC 22 will be referred to as the electrical signal ES instead of being referred to as the amplified signal AS.

Figure 4:
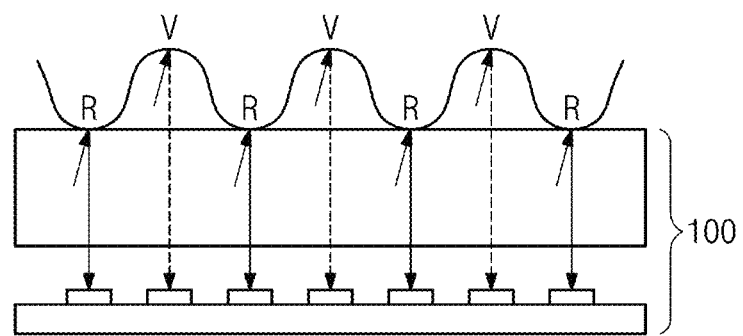
FIG. 4 is a cross-sectional view showing a state in which a user's fingerprint is in a normal contact.
Figure 5:
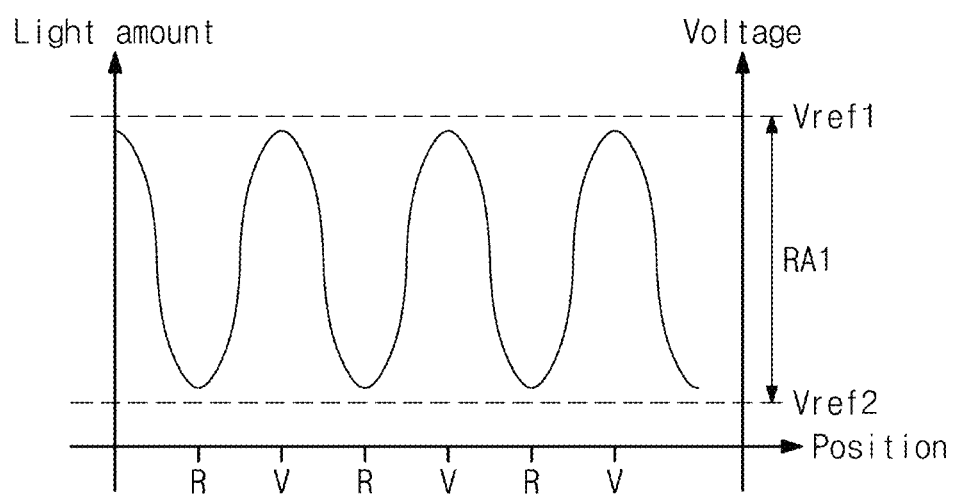
FIG. 5 is a waveform diagram showing a waveform of a signal input to an ADC in the case of FIG. 4.

FIG. 4 is a cross-sectional view showing a state in which a user's fingerprint is in a normal contact, and FIG. 5 is a waveform diagram showing a waveform of a signal input to an ADC in the case of FIG. 4.

Herein, the term "normal" may be used to represent a representative contact condition in which the user's fingerprint is in a contact with the biometric information detecting device 100. In this case, contact conditions other than the "normal" contact condition may be described as "abnormal" contact conditions.

In some embodiments, the term "normal" may be used to represent that the user's fingerprint is in contact with the biometric information detecting device in a direction that is normal to a surface of the biometric information detecting device. In this case, the contact conditions in a direction that is not normal to a surface of the biometric information detecting device, for example, a fingerprint contacting surface of the biometric information detecting device in an angle or while rolling on surface of the biometric information detecting device, may be described as "abnormal" contact conditions.

Referring to FIGS. 3, 4, and 5, when the user's fingerprint normally makes contact with the biometric information detecting device 100, the difference in amount between the light reflected by the ridge R of the fingerprint and the light reflected by the valley V of the fingerprint may be clearly shown.

The controller 30 may widely set the first reference condition of the ADC 22 as a first reference range RA1 defined between a first reference voltage Vref1 and a second reference voltage Vref2. The first reference range RA1 is set based on the difference in amount between the light measured at the ridge R and the light measured at the valley V in a normal contact state, and data about the first reference range RA1 may be previously set in the controller 30.

The controller 30 may apply the first reference voltage Vref1 and the second reference voltage Vref2 to the ADC22 such that the ADC 22 converts the electrical signals ES to the digital signals on the first reference condition.

Figure 6:
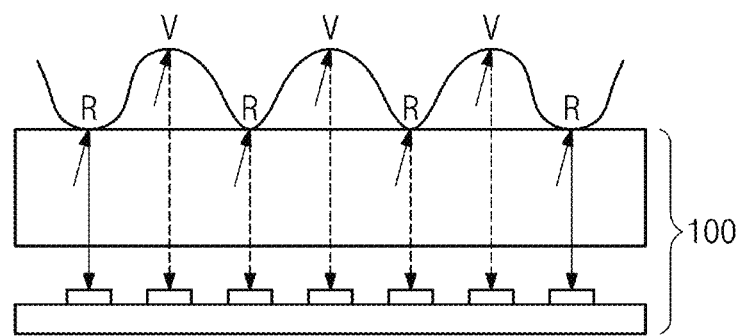
FIG. 6 is a cross-sectional view showing a state in which a user's fingerprint is in an abnormal contact.
Figure 7:
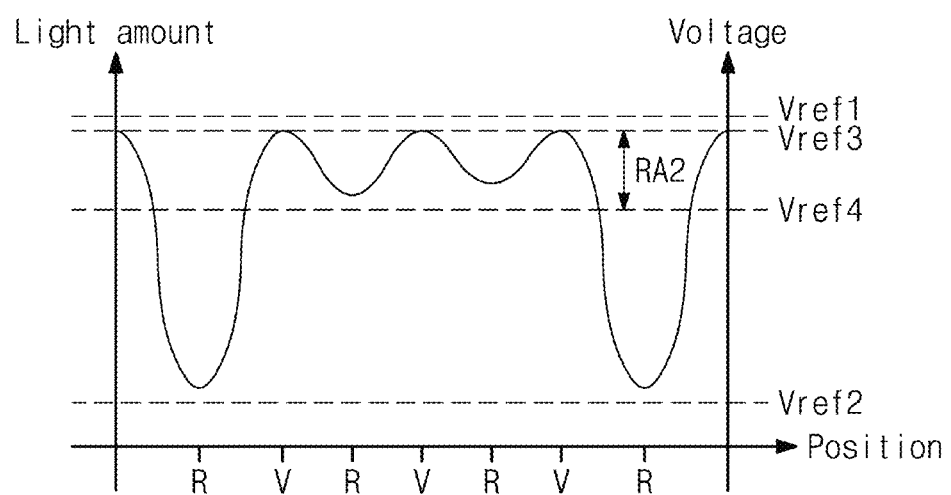
FIG. 7 is a waveform diagram showing a waveform of the signal input to the ADC in the case of FIG. 6.

FIG. 6 is a cross-sectional view showing a state in which a user's fingerprint is in an abnormal contact, and FIG. 7 is a waveform diagram showing a waveform of the signal input to the ADC in the case of FIG. 6.

Referring to FIGS. 3, 6, and 7, in a case that the user makes an abnormal contact with the biometric information detecting device 100, for example, with a dry finger, for the recognition of the user's fingerprint, a contact area between the ridge R of the fingerprint and the biometric information detecting device 100 may be reduced compared to a case when the user's fingerprint normally makes contact with the biometric information detecting device 100.

As described above, when the contact area between the ridge R of the fingerprint and the biometric information detecting device 100 is reduced, the difference in amount between the light reflected by the ridge R of the fingerprint and the light reflected by the valley V of the fingerprint may not be clearly distinguished. When the electrical signals ES measured from the dry finger are converted to the digital signal by the ADC 22 set to the first reference range RA1 (refer to FIG. 5), the ridge R and the valley V may be difficult to be distinguished from each other. That is, when the electrical signals ES are converted to the digital signal by the ADC 22 set to the first reference range RA1, the ridge R may be recognized as the valley V, or the valley V may be recognized as the ridge R.

Accordingly, the controller 30 may narrowly set the second reference condition of the ADC 22 to a second reference range RA2 defined between third and fourth reference voltages Vref3 and Vref4. The second reference range RA2 is set based on the difference in amount between the light measured at the ridge R and the light measured at the valley V when the user's fingerprint is in an abnormal contact, and data about the second reference range RA2 may be previously set in the controller 30.

As an example of the present disclosure, the third reference voltage Vref3 may be equal to or smaller than the first reference voltage Vref1, and the fourth reference voltage Vref4 may be greater than the second reference voltage Vref2. The voltage levels of the third and fourth reference voltages Vref3 and Vref4 may be set appropriately based on experimental data.

In the above descriptions, the dry finger has been described as an example of the abnormal contact state, but the abnormal contact state should not be limited to the dry finger. In addition, in a case that the cause of the abnormal contact state and the resulting phenomenon are different from the abnormal contact state and the resulting phenomenon due to the dry finger, the second reference condition may be set differently from the above-mentioned condition.

Figure 8:
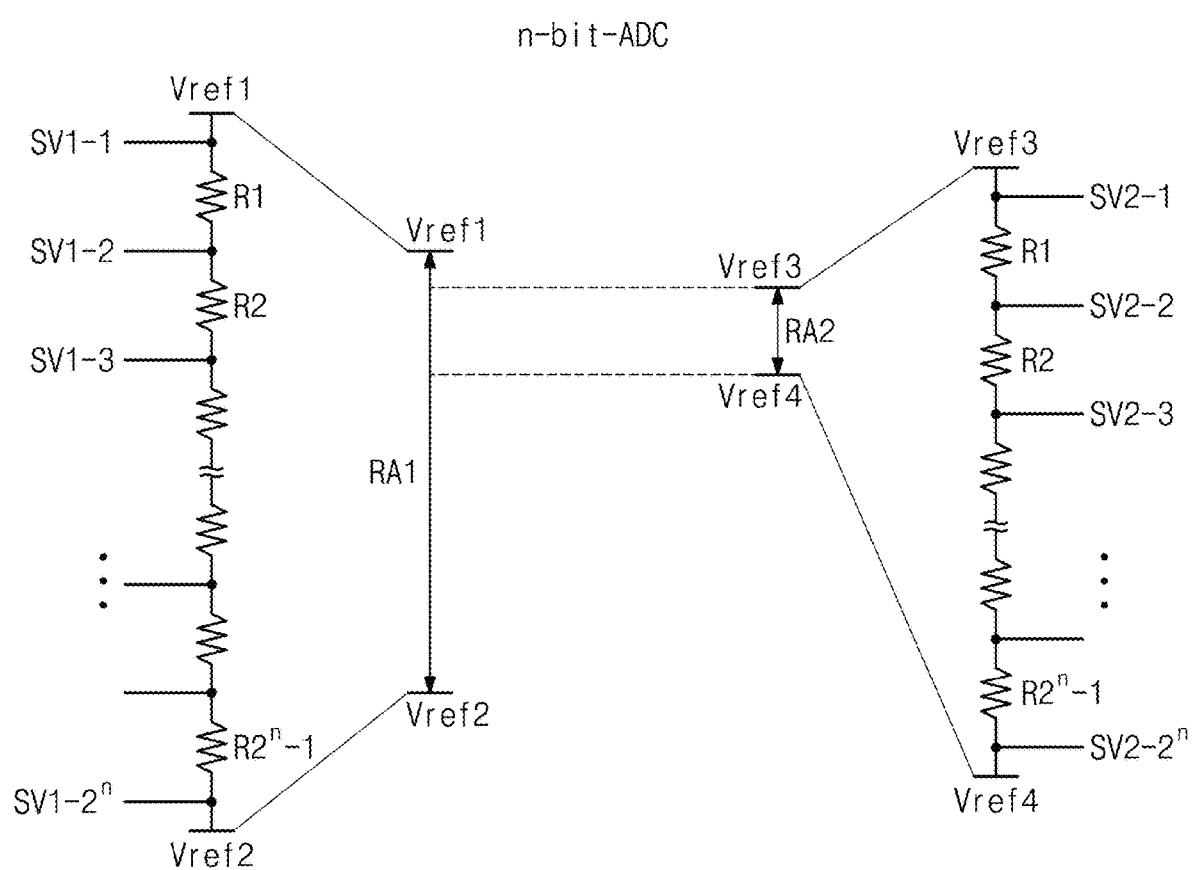
FIG. 8 is a view showing a digital output signal of the ADC in a first reference range shown in FIG. 5 and a digital output signal of the ADC in a second reference range shown in FIG. 7.

FIG. 8 is a view showing a digital output signal of the ADC 22 in the first reference range RA1 shown in FIG. 5 and a digital output signal of the ADC 22 in the second reference range RA2 shown in FIG. 7.

Referring to FIGS. 3 and 8, in a case that the ADC 22 is an n-bit ADC that converts the electrical signal ES in an analog form to an n-bit digital signal, the n-bit ADC 22 may convert the electrical signal ES to the n-bit digital signal. The n-bit ADC 22 may select one of $2^n$ digital signals as the output signal according to the voltage level of the electrical signal ES.

In the case that the n-bit ADC 22 is operated on the first reference condition, the first reference range RA1 may be divided into $2^n$ stage voltages SV1-1 to SV1-$2^n$ by a resistor string in which $2^n-1$ resistors R1 to R$2^n$-1 are connected to each other in series. The $2^n$ stage voltages SV1-1 to SV1-$2^n$ may have n-bit digital signals.

Accordingly, in the case that the n-bit ADC 22 is operated on the first reference condition, the n-bit ADC 22 selects one stage voltage corresponding to the electrical signal ES among the $2^n$ stage voltages SV1-1 to SV1-$2^n$. Then, the n-bit ADC 22 outputs the n-bit digital signal corresponding to the selected stage voltage as the first result signal RS1.

In the case that the n-bit ADC 22 is operated on the second reference condition, the second reference range RA2 may be divided into $2^n$ stage voltages SV2-1 to SV2-$2^n$ by a resistor string in which $2^n-1$ resistors R1 to R$2^n$-1 are connected to each other in series. The $2^n$ stage voltages SV2-1 to SV2-$2^n$ may have n-bit digital signals.

Accordingly, in the case that the n-bit ADC 22 is operated on the second reference condition, the n-bit ADC 22 selects one stage voltage corresponding to the electrical signal ES among the $2^n$ stage voltages SV2-1 to SV2-$2^n$. Then, the n-bit ADC 22 outputs the n-bit digital signal corresponding to the selected stage voltage as the second result signal RS2.

The second reference range RA2 has a voltage range narrower than that of the first reference range RA1, however, the second reference range RA2 is divided into the same number (e.g., $2^n$ numbers) of stages as that of the first reference range RA1. Accordingly, a voltage range of each section of the second reference range RA2 is narrower than a voltage range of each section of the first reference range RA1, and thus it is advantageous to convert the electrical signals ES by using the second reference range RA2 in a case that the electrical signals ES, in which the difference in amount between the light reflected by the valley and the light reflected by the ridge is relatively small, are input to the n-bit ADC 22. Since the n-bit ADC 22 operated on the second reference condition may distinguish the valley and the ridge from each other, an error rate in which the ridge is recognized as the valley, or the valley is recognized as the ridge, may be reduced in an abnormal contact state.

Referring to FIG. 2, the first result signal RS1 and the second result signal RS2 may be output from the ADC 22 of the determiner 20 with a time interval. In this case, the processor 40 may further include a buffer (not shown) that temporarily stores a result signal that is input first thereto between the first result signal RS1 and the second result signal RS2.

The synthesizer 41 receives the first result signal RS1 and the second result signal RS2 that are output from the ADC 22. As described above, in the case that the signal that is input first is stored in the buffer, the synthesizer 41 may directly receive one result signal of the first and second result signals RS1 and RS2 from the ADC 22 and receive the other result signal of the first and second result signals RS1 and RS2 from the buffer.

The synthesizer 41 applies different weights to the first and second result signals RS1 and RS2 and sums the first and second result signals RS1 and RS2 to generate the final result signal. The weights respectively applied to the first and second result signals RS1 and RS2 may be previously set and stored in a look-up table.

According to another embodiment, the synthesizer 41 may compare the first and second result signals RS1 and RS2 to each other and select one of the first and second result signals RS1 and RS2 as the final result signal when the first and second result signals RS1 and RS2 are different from each other.

In the above descriptions, the ADC 22 is operated with a time interval on two reference conditions, but the number of the reference conditions should not be limited to two. That is, the ADC22 may convert the electrical signal ES to the digital signal on three or more different reference conditions. However, when the number of the reference conditions increases, a time of processing the electrical signal ES increases. Therefore, the number of the reference conditions may be appropriately set in consideration of the number of sensing devices, the processing time, etc.

In addition, the determiner 20 includes the one ADC 22 operated on the two reference conditions in the present exemplary embodiment, but the number of the ADCs included in the determiner 20 should not be limited to one. That is, a determiner 25 (refer to FIG. 9) may include two ADCs 23 and 24 (refer to FIG. 9) respectively operated on two reference conditions.

Figure 9:
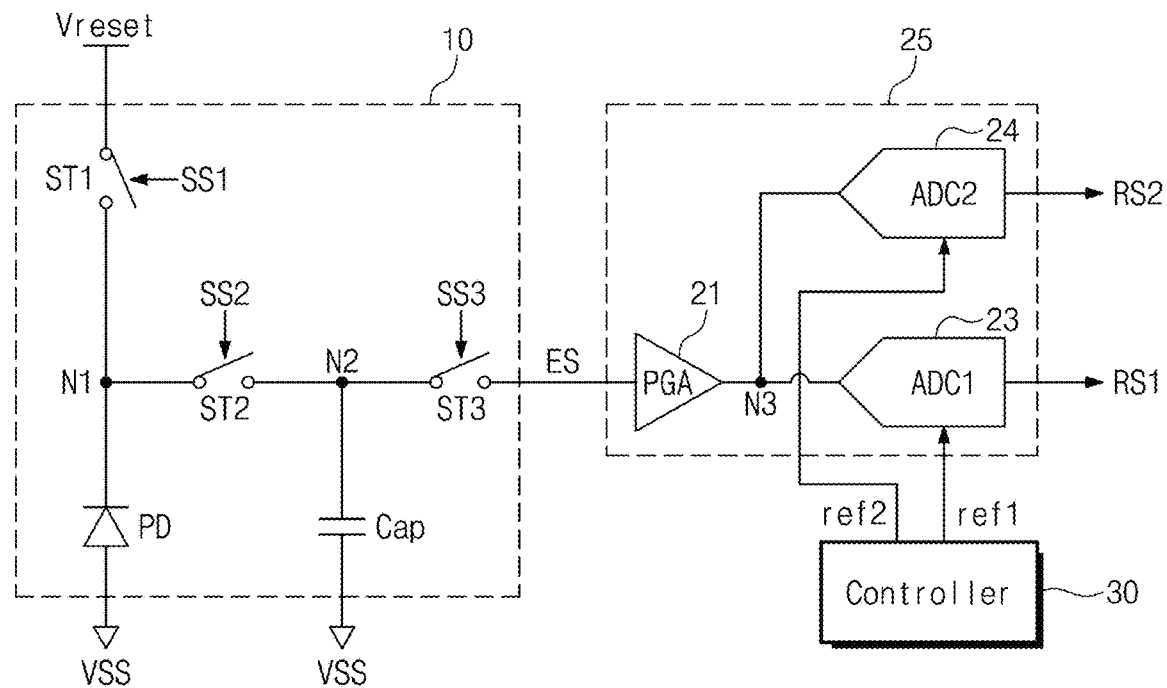
FIG. 9 is a circuit diagram showing a configuration of a biometric information detecting device according to another exemplary embodiment of the present disclosure.

FIG. 9 is a circuit diagram showing a configuration of a biometric information detecting device according to another exemplary embodiment of the present disclosure. In FIG. 9, the biometric information detecting device has the same configuration and function as those of the biometric information detecting device shown in FIG. 3 except for the determiner 25, and thus detailed descriptions of the same elements will be omitted.

Referring to FIG. 9, the determiner 25 of the biometric information detecting device according to the exemplary embodiment includes a PGA 21, a first ADC 23, and a second ADC 24.

The first ADC 23 receives the first reference signal ref1 from the controller 30 to convert the electrical signal ES to a digital signal on the first reference condition. In addition, the second ADC 24 receives the second reference signal ref2 from the controller 30 to convert the electrical signal ES to another digital signal on the second reference condition. Here, the first and second reference conditions are substantially similar to those described with reference to FIGS. 4 to 8, and thus detailed descriptions of the first and second reference conditions will be omitted to avoid redundancy.

The first ADC 23 converts the electrical signal ES to a first digital signal on the first reference condition to output a first result signal RS1, and the second ADC 24 converts the electrical signal ES to a second digital signal on the second reference condition to output a second result signal RS2. Input terminals of the first and second ADCs 23 and 24 are commonly connected to a third node N3, and thus the first and second ADCs 23 and 24 receive the same electrical signal ES. That is, the first and second ADCs 23 and 24 convert the one input signal to the digital signal based on different reference conditions from each other and output different result signals RS1 and RS2.

In the above descriptions, the determiner 25 includes two ADCs (i.e., first and second ADCs 23 and 24) respectively operated on two different reference conditions from each other, but the number of the reference conditions should not be limited to two. That is, the determiner 25 may include three or more ADCs respectively operated on three or more different reference conditions from each other. However, when the number of the ADCs increases, the circuit of the biometric information detecting device becomes complex and costly, and the number of components increases. Therefore, the number of the ADCs may be appropriately set in consideration of the circuit configuration, the cost, the number of components, etc.

In addition, different from the embodiment shown in FIG. 3, since the biometric information detecting device shown in FIG. 9 includes the two ADCs 23 and 24 respectively operated on different reference conditions from each other, the two ADCs 23 and 24 may be substantially simultaneously operated. As a result, the processor 40 (refer to FIG. 2) does not need to further include a buffer in the case of the biometric information detecting device employing the determiner 25 shown in FIG. 9. That is, the synthesizer 41 (refer to FIG. 2) may substantially simultaneously receive the first and second result signals RS1 and RS2 that are respectively output from the two ADCs 23 and 24 and synthesize the first and second result signals RS1 and RS2.

Figure 10:
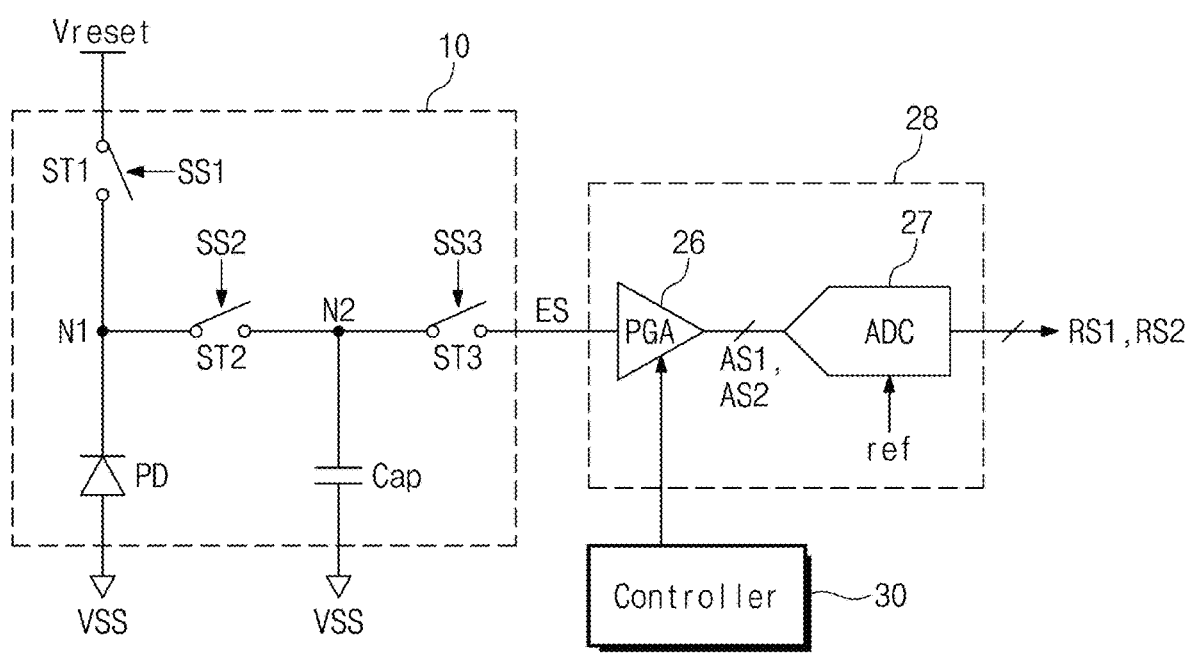
FIG. 10 is a circuit diagram showing a configuration of a biometric information detecting device according to another exemplary embodiment of the present disclosure.

FIG. 10 is a circuit diagram showing a configuration of a biometric information detecting device according to another exemplary embodiment of the present disclosure. In FIG. 10, the biometric information detecting device has the same configuration and function as those of the biometric information detecting device shown in FIG. 3 except for a determiner 28, and thus detailed descriptions of the same elements will be omitted.

Referring to FIG. 10, the determiner 28 of the biometric information detecting device according to the exemplary embodiment includes a PGA 26 and an ADC 27. The PGA 26 receives and amplifies an electrical signal ES output from the measurer 10. In this case, the controller 30 may control a gain of the PGA 26. In detail, the controller 30 controls the PGA 26 such that the PGA 26 is sequentially operated on a first reference condition and a second reference condition. The controller 30 may set the gain of the PGA 26 as a first value on the first reference condition and set the gain of the PGA 26 as a second value on the second reference condition.

In the case that the gain of the PGA 26 has the first value, the electrical signal ES is amplified to a first amplified signal AS1, and in the case that the gain of the PGA 26 has the second value, the electrical signal ES is amplified to a second amplified signal AS2.

The ADC 27 receives the first amplified signal AS1 in an analog form and converts the first amplified signal AS1 to a first result signal RS1. When the second amplified signal AS2 in an analog form is received, the ADC 27 converts the second amplified signal AS2 to a second result signal RS2 in digital form. Here, the ADC 27 converts the first and second amplified signals AS1 and AS2 to the first and second result signals RS1 and RS2 in a respective digital signal on the same condition. That is, the driving condition of the ADC 27 is not changed, and the gain of the PGA 26 is changed to different values according to the above-mentioned two reference conditions.

Although not shown in figures, the first and second result signals RS1 and RS2 are transmitted to the synthesizer 41 (refer to FIG. 2), and the synthesizer 41 synthesizes the first and second result signals RS1 and RS2 to generate the final result signal FRS (refer to FIG. 2).

Figure 11:
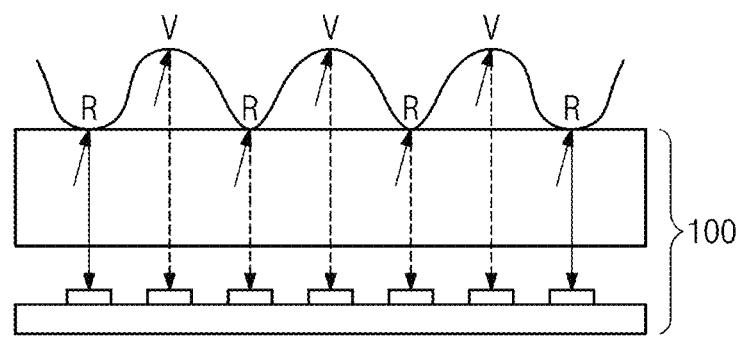
FIG. 11 is a cross-sectional view showing a state in which a user's fingerprint is in an abnormal contact.
Figure 12:
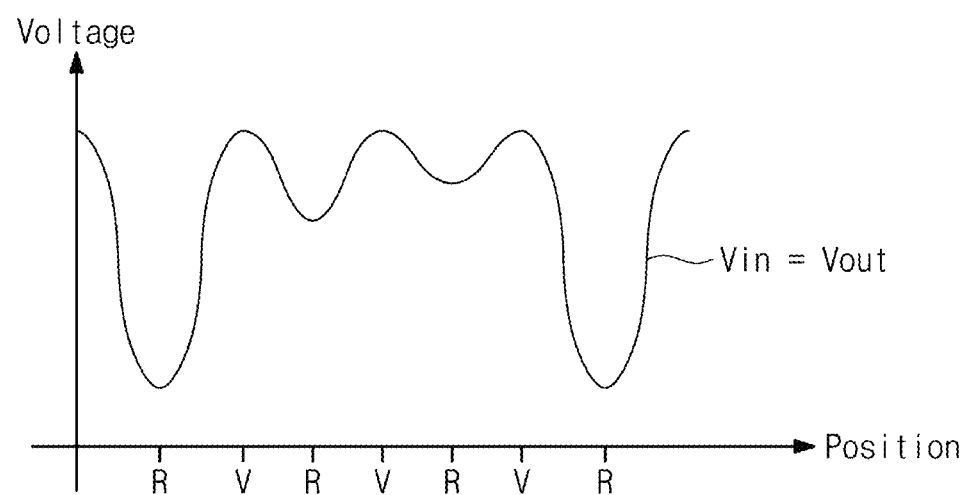
FIG. 12 is a waveform diagram showing waveforms of input/output signals of a PGA operated in a first reference condition.
Figure 13:
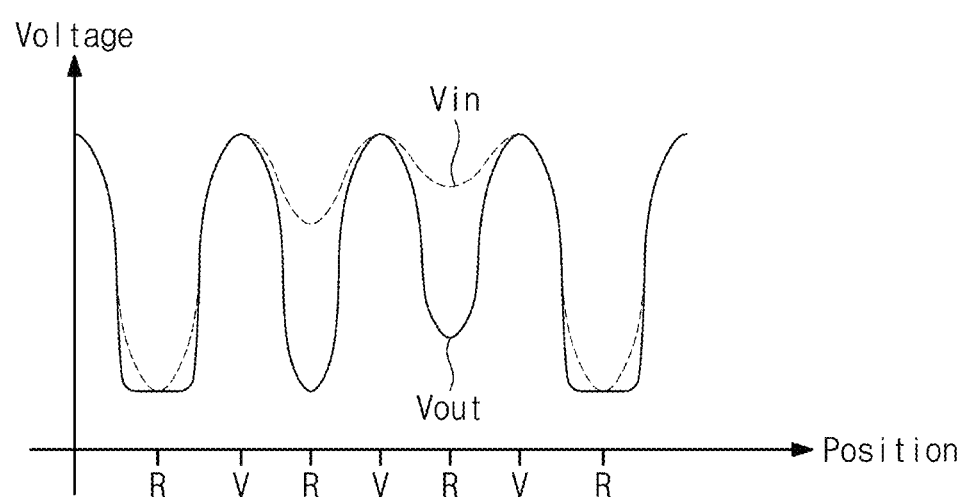
FIG. 13 is a waveform diagram showing waveforms of input/output signals of a PGA operated in a second reference condition.

FIG. 11 is a cross-sectional view showing a state in which a user's fingerprint is in an abnormal contact, FIG. 12 is a waveform diagram showing waveforms of input/output signals of a PGA operated in a first reference condition, and FIG. 13 is a waveform diagram showing waveforms of input/output signals of a PGA operated in a second reference condition.

Referring to FIGS. 10 to 13, in the case that the user's fingerprint comes into contact with the biometric information detecting device 100, for example, with a dry finger, for the recognition of the user's fingerprint, the contact area between the ridge R of the fingerprint and the biometric information detecting device 100 may be reduced compared to a case when the user's fingerprint normally makes contact with the biometric information detecting device 100. As described above, when the contact area between the ridge R of the fingerprint and the biometric information detecting device 100 is reduced, the difference in amount between the light reflected by the ridge R of the fingerprint and the light reflected by the valley V of the fingerprint may not be clearly distinguished.

When an input signal input to a first input terminal of the PGA 26, a reference signal input to a second input terminal of the PGA 26, and an output signal from the PGA 26 are respectively referred to as "Vin", "Vref", and "Vout", the output signal Vout satisfies the following Equation.

$$Vout = Vref + (Vin - Vref) \times G \quad \text{Equation}$$

wherein, "G" denotes the gain of the PGA 26.

As shown in FIG. 12, in a case of the first reference condition in which the gain of the PGA 26 is set to "1", the input signal Vin may have the same value as that of the output signal Vout. That is, among the electrical signals ES measured from the dry finger on the first reference condition, the electrical signal measured from the ridge R in an abnormal contact state is sometimes not recognized as the ridge R. That is, when a signal in which the difference in amount between the light reflected by the ridge R of the fingerprint and the light reflected by the valley V of the fingerprint is not clearly distinguished is input to the ADC 27 and converted to the digital signal, the ridge R may be recognized as the valley V, or the valley V may be recognized as the ridge R.

As shown in FIG. 13, in a case of the second reference condition in which the gain of the PGA 26 is set to "2", the output signal Vout may have a value that is amplified more than the input signal Vin. That is, even though the signal in which the difference in amount between the light reflected by the ridge R of the fingerprint and the light reflected by the valley V of the fingerprint is not clearly distinguished is input to the PGA 26, the PGA 26 amplifies the input signal Vin on the second reference condition, and thus the output signal Vout in which the difference in amount between the light reflected by the ridge R of the finger print and the light reflected by the valley V of the fingerprint is clearly distinguished may be output.

In the above descriptions, the dry finger has been described as a representative example of the abnormal contact state, but the abnormal contact state may include various cases without being limited to the dry finger. In a case that the cause of the abnormal contact state and the resulting phenomenon are different from the abnormal contact state and the resulting phenomenon due to a dry finger, the second reference condition may be set differently from the above-mentioned condition.

In the above descriptions, the biometric information detecting device according to the present disclosure has been described by taking an optical sensing method as an example. However, the biometric information detecting device according to the present disclosure may be applied to an ultrasonic sensing method, a pressure sensing method, a thermal sensing method, and the like.

For instance, in the case of the ultrasonic sensing method, the abnormal contact state (i.e., the difference between the electrical signal measured at the ridge and the electrical signal measured at the valley V is not clearly distinguished) may occur by a wet finger. In this case, similarly, the determiner of the biometric information detecting device according to the present disclosure may determine whether the electrical signal corresponds to the ridge or the valley using the two or more different reference conditions from each other and synthesize the determined results to recognize the ridge or the valley. Accordingly, when the electrical signal is determined on two or more reference conditions as the exemplary embodiment of the present disclosure, the ridge and the valley may be clearly distinguished from each other even in an abnormal contact state when compared to a case in which the electrical signal is determined on one reference condition.

Hereinafter, embodiments of the display apparatus employing the biometric information detecting device will be described.

Figure 14:
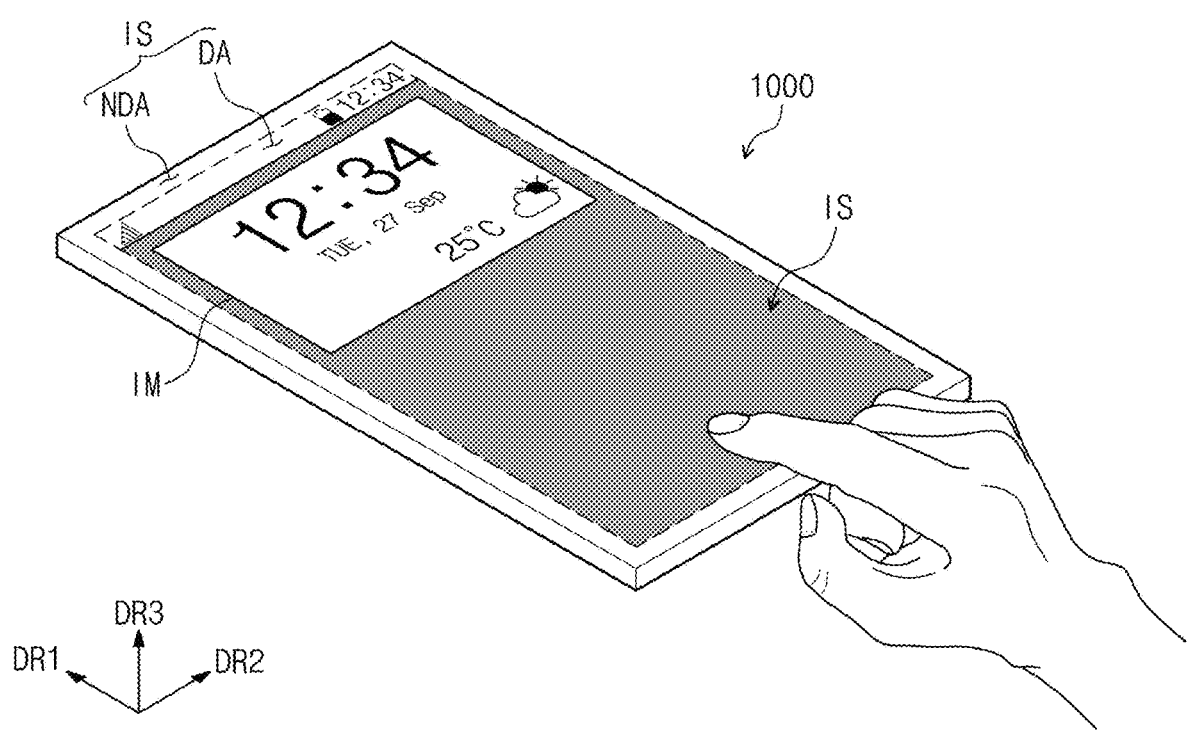
FIG. 14 is a perspective view showing a display apparatus according to an exemplary embodiment of the present disclosure.
Figure 15:
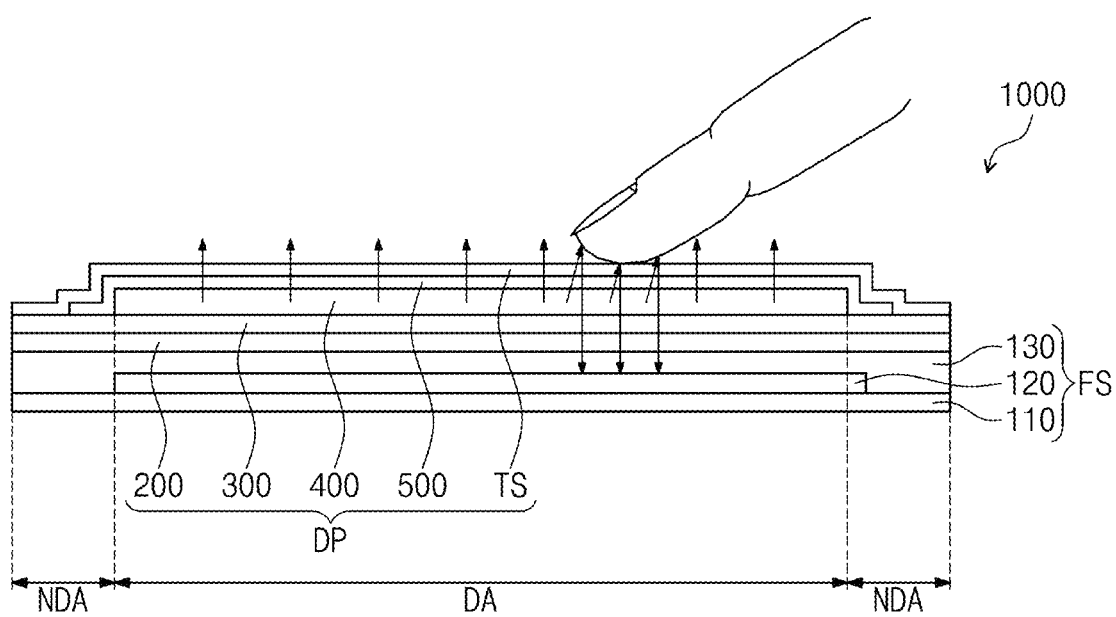
FIG. 15 is a cross-sectional view showing the display apparatus of FIG. 14.

FIG. 14 is a perspective view showing a display apparatus 1000 according to an exemplary embodiment of the present disclosure, and FIG. 15 is a cross-sectional view showing the display apparatus of FIG. 14.

Referring to FIG. 14, the display apparatus 1000 includes a display surface IS in which a display area DA in which an image IM is displayed, and a non-display area NDA disposed adjacent to the display area DA are defined. The display area DA includes a plurality of pixels (not shown) arranged therein. The non-display area NDA is an area through which no image is displayed. The display surface IS of the display apparatus 1000 may be an upper surface disposed at an outermost position of the display apparatus 1000 and may be a surface at which a user is looking. In FIG. 14, the display area DA may have a quadrangular shape, and the non-display area NDA has a shape surrounding the display area DA. However, the shapes of the display area DA and the non-display area NDA should not be limited thereto or thereby, and the display area DA and the non-display area NDA may have various shapes and configurations.

As shown in FIG. 14, the display surface IS through which the image IM is displayed is substantially parallel to a surface defined by a first direction DR1 and a second direction DR2. A third direction DR3 indicates a normal direction of the display surface IS, i.e., a thickness direction of the display apparatus 1000. A front surface (or an upper surface) and a rear surface (or a lower surface) of each member of the display apparatus 1000 are distinguished from each other by the third direction DR3. However, directions indicated by the first, second, and third directions DR1, DR2, and DR3 are relative to each other, and the first, second, and third directions DR1, DR2, and DR3 may be changed to other directions.

The display apparatus 1000 may sense a user's touch input to the display area DA. The display apparatus 1000 may include a touch sensing module (not shown) that senses the user's touch input to the display area DA.

A sensing area that recognizes the biometric information of the user may be defined in the display surface IS of the display apparatus 1000. As an example of the present disclosure, an entire area of the display area DA may serve as the sensing area, and as another example, only a portion of the display area DA may serve as the sensing area.

FIG. 14 shows the example in which the entire area of the display area DA serves as the sensing area.

The display apparatus 1000 senses the user's fingerprint or a user's heart rate through the sensing area by a minute movement of the user's finger to measure the biometric information of the user. As a method of acquiring the biometric information through the sensing area, various methods, such as the optical sensing method, the ultrasonic sensing method, the pressure sensing method, the thermal sensing method, etc., may be used.

Hereinafter, the display apparatus 1000 that senses the user's fingerprint using the optical sensing method will be described in detail with reference to FIG. 15.

Referring to FIG. 15, the display apparatus 1000 includes a display panel DP displaying an image and a biometric information detecting device FS disposed under (or on) the display panel DP to detect the biometric information of the user.

The display panel DP may be a light emitting type display panel. For instance, the display panel DP may be an organic light emitting display panel or a quantum dot light emitting display panel. A light emitting layer of the organic light emitting display panel includes an organic light emitting material. A light emitting layer of the quantum dot light emitting display panel includes a quantum dot and a quantum rod. Hereinafter, the organic light emitting display panel will be described as an example of the display panel DP.

The display panel DP includes a display substrate 200, a driving layer 300, a display element layer 400, and an encapsulation layer 500. Although not shown separately, the display panel DP may further include a protective member disposed under (or on) the display substrate 200 and a window member disposed on (or under) the encapsulation layer 500. In addition, the display panel DP may further include one or more functional layers, such as an anti-reflection layer, a refractive control layer, etc.

The display substrate 200 may include at least one plastic film. The display substrate 200 may be a flexible substrate including a plastic substrate, a glass substrate, a metal substrate, or a substrate made of an organic/inorganic composite material. The display area DA and the non-display area NDA described with reference to FIG. 14 may be equally applied to the display substrate 200.

The driving layer 300 is disposed on the display substrate 200. The driving layer 300 includes at least one intermediate insulating layer and a circuit device. The intermediate insulating layer may include at least one intermediate inorganic layer and at least one intermediate organic layer. The circuit device includes signal lines, a driving circuit that drives the signal lines, and another driving circuit that drives display elements included in the display element layer 400.

The display element layer 400 is disposed on the driving layer 300. The display element layer 400 includes a plurality of display elements. In the exemplary embodiment of the present disclosure, the display element may be, but not limited to, an organic light emitting diode. The display element layer 400 may further include an organic layer such as a pixel definition layer.

The encapsulation layer 500 encapsulates the display element layer 400. The encapsulation layer 500 includes at least one inorganic layer (hereinafter, referred to as an "encapsulation inorganic layer"). The encapsulation layer 500 may further include at least one organic layer (hereinafter, referred to as an "encapsulation organic layer"). The encapsulation inorganic layer protects the display element layer 400 from moisture and oxygen, and the encapsulation organic layer protect the display element layer 400 from foreign substances such as dust particles. The encapsulation inorganic layer may include a silicon nitride layer, a silicon oxynitride layer/a silicon oxide layer, a titanium oxide layer, or an aluminum oxide layer. The encapsulation organic layer may include an acryl-based organic layer, but it should not be limited thereto or thereby.

The display panel DP may further include a touch sensing module TS disposed on the encapsulation layer 500. The touch sensing module TS obtains coordinate information of an external input. The touch sensing module TS may be directly disposed on the encapsulation layer 500. In the present disclosure, the term "directly disposed" means that two or more layers are formed through consecutive processes except that the layers are attached to each other using a separate adhesive layer, but it should not be limited thereto or thereby. The touch sensing module TS may be attached onto the encapsulation layer 500 by an adhesive as a separate independent module.

The biometric information detecting device FS includes a substrate 110, a sensing layer 120 disposed on the substrate 110, and a cover layer 130 covering the sensing layer 120. The substrate 110 may include a plastic film. The substrate 110 may be attached and fixed to a lower surface of the display substrate 200 of the display panel DP.

The sensing layer 120 may include a plurality of sensing devices arranged on the substrate 110. The sensing devices may include devices that sense a user's fingerprint or heart rate by the minute movement of the user's finger to measure the biometric information of the user. As an example of the present disclosure, the sensing device may include one of an optical sensing device, a pressure sensing device, and a thermal sensing device.

FIG. 15 shows a structure in which the sensing device includes the optical sensing device, and the sensing device may be a fingerprint sensor that receives the light reflected by the user's finger to sense the fingerprint.

When the display panel DP is operated, a light including image information is output from the light emitting layer of the display panel DP, and the output light is displayed as the image after passing through the display surface. When the user's finger makes contact with the display surface, the light is reflected by the user's finger and provided to the biometric information detecting device FS disposed under (or on) the display panel DP. In this case, the sensing device senses the reflected light, and sensed information is generated as a fingerprint image by the processes described with reference to FIGS. 2 to 13.

The cover layer 130 includes an insulating material to cover the sensing layer 120 and includes a protective layer to protect the sensing device. As an example of the present disclosure, the protective layer includes a silicon nitride material or a silicon oxide material.

The cover layer 130 may further include a collimator layer that filters the light to allow the sensing device to receive only the light reflected by the user's finger. The collimator layer may have a structure in which a plurality of openings or slits is formed. As an example, the openings or the slits may be formed to pass only the light having a wavelength equal to or smaller than about 600 nm among light incident thereto. Accordingly, the cover layer 130 may prevent the light other than the light reflected by the user's finger from being incident thereto.

Figure 16:
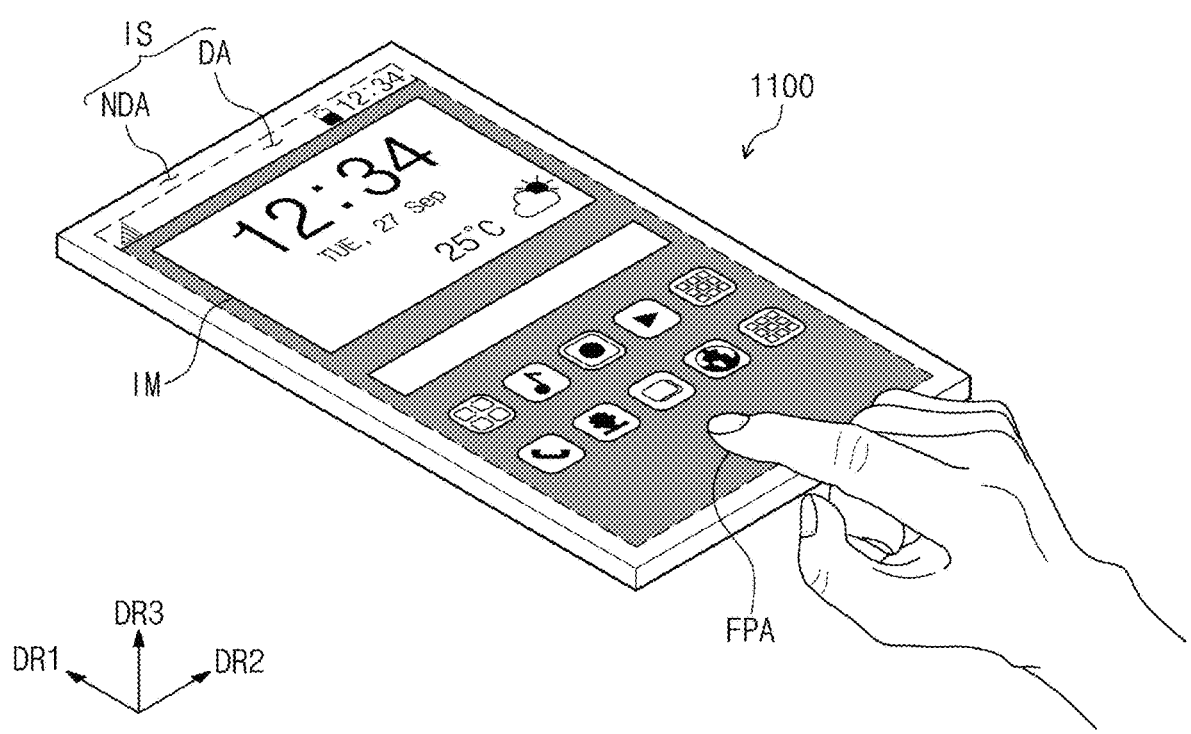
FIG. 16 is a perspective view showing a display apparatus according to another exemplary embodiment of the present disclosure.
Figure 17:
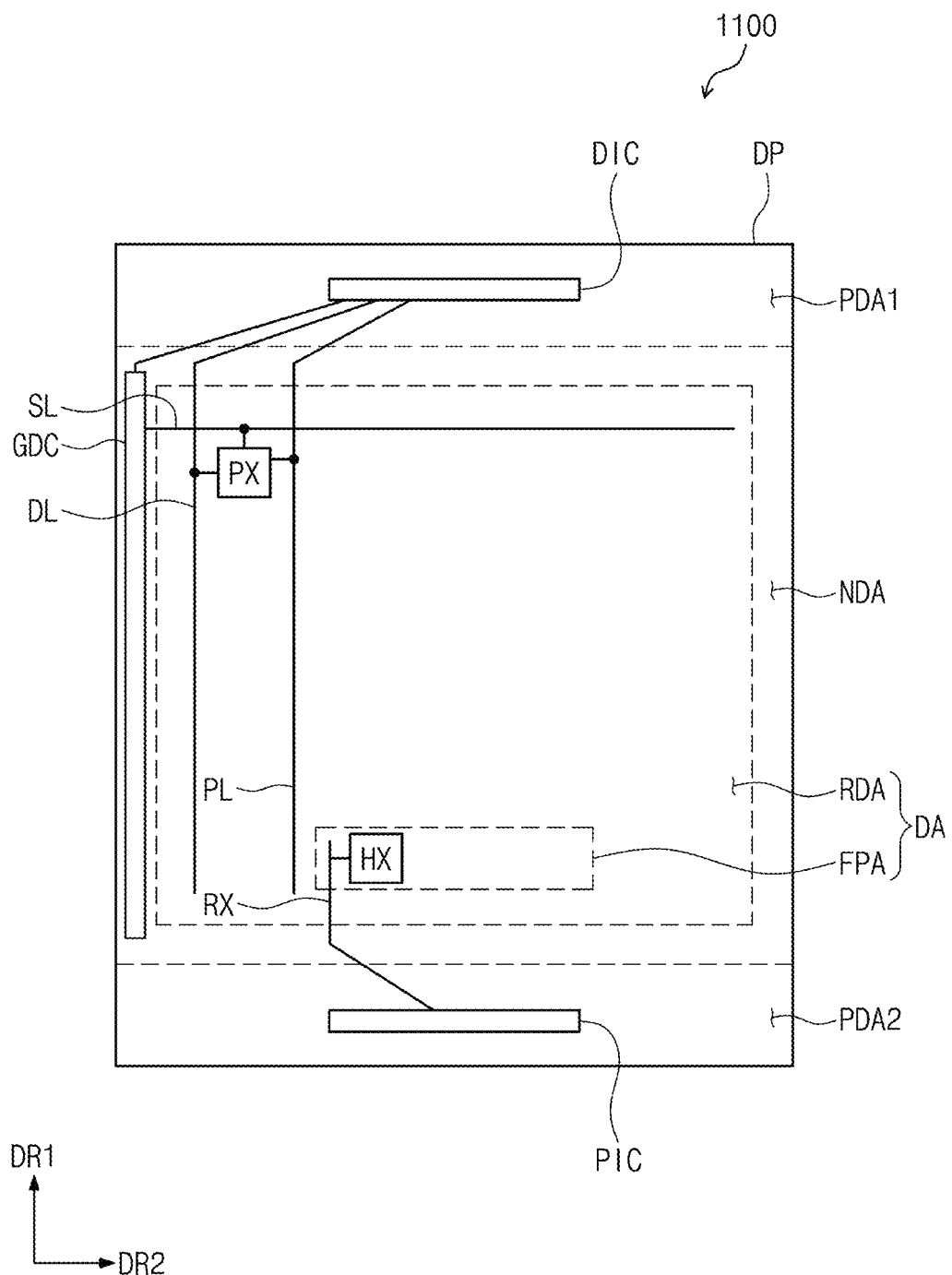
FIG. 17 is a plan view showing the display apparatus of FIG. 16.

FIG. 16 is a perspective view showing a display apparatus according to another exemplary embodiment of the present disclosure, and FIG. 17 is a plan view showing the display apparatus of FIG. 16. In FIG. 16, the same reference numerals denote the same elements in FIG. 14, and thus detailed descriptions of the same elements will be omitted.

Referring to FIG. 16, a sensing area FPA may be further defined in the display surface IS of a display apparatus 1100. The display apparatus 1100 may sense a user's input by sensing the light incident to the sensing area FPA. The sensing area FPA may sense the user's fingerprint or may measure the heart rate of the user by the minute movement of the user's finger. The display apparatus 1100 may include a sensing pixel HX (refer to FIG. 17) disposed in the sensing area FPA.

In FIG. 16, the sensing area FPA is defined in the display area DA, but it should not be limited thereto or thereby. The sensing area FPA may be defined in the non-display area NDA or defined to overlap with both the display area DA and the non-display area NDA.

Referring to FIG. 17, the display apparatus 1100 may include a display panel DP, a first driving circuit chip DIC, and a second driving chip PIC.

The display area DA may include the sensing area FPA and a normal display area RDA spaced apart from the sensing area FPA. The sensing area FPA and the normal display area RDA may have different circuit configurations from each other.

The display panel DP may include a display pixel PX, a sensing pixel HX, a plurality of signal lines, and a scan driving circuit GDC. The display pixel PX may be disposed in the display area DA to display an image. The sensing pixel HX is disposed in the sensing area FPA and receives the light reflected by the user to sense the user's input.

The signal lines include a scan line SL, a data line DL, a power line PL, and a sensing line RX. Each of the scan line SL, the data line DL, and the power line PL is provided in a plural number, however FIG. 17 shows one scan line SL, one data line DL, and one power line PL as a representative example.

The scan line SL, the data line DL, and the power line PL are connected to the display pixel PX. The data line DL and the power line PL are connected to the first driving circuit chip DIC to receive a driving signal.

The sensing pixel HX may be connected to the sensing line RX. The sensing pixel HX may be connected to the scan line SL and the power line PL to which a corresponding display pixel is connected. The sensing line RX may be connected to the second driving circuit chip PIC.

The scan driving circuit GDC may be disposed in the non-display area NDA. The scan driving circuit GDC may generate a scan signal and output the generated scan signal to the scan line SL.

The scan driving circuit GDC may be formed through the same process as that applied to the driving circuit of the display pixels PX, for example, a low temperature polycrystalline silicon (LTPS) process, a low temperature polycrystalline oxide (LTPO) process, etc.

The first driving circuit chip DIC may be disposed in a first pad area PDA1. The first driving circuit chip DIC may be directly mounted in the first pad area PDA1, but it should not be limited thereto or thereby. That is, the first driving circuit chip DIC may be mounted on a flexible printed circuit board (not shown) connected to the first pad area PDA1. The first driving circuit chip DIC provides signals to drive the display panel DP. That is, the first driving circuit chip DIC may provide the signals to the data line DL and the power line PL. The first driving circuit chip DIC may be, but not limited to, a source driver integrated circuit that applies a data signal to the data line DL.

The second driving circuit chip PIC may be disposed in a second pad area PDA2. The second driving circuit chip PIC may be directly mounted in the second pad area PDA2, but it should not be limited thereto or thereby. That is, the second driving circuit chip PIC may be mounted on a flexible printed circuit board (not shown) connected to the second pad area PDA2. The second driving circuit chip PIC receives the signal sensed by the sensing pixel HX through the sensing line RX and senses the user's input based on the received signal.

The second driving circuit chip PIC may include at least one component among the determiners 20, 25, and 28, the controller 30, and the processor 40 shown in FIGS. 2 to 10. In addition, the second driving circuit chip PIC may receive a switching signal and a voltage signal that drive the sensing pixel HX and provide the switching signal and the voltage signal to the sensing pixel HX through the sensing line RX.

Although the exemplary embodiments of the present disclosure have been described, it is understood that the present disclosure should not be limited to these exemplary embodiments, and various changes and modifications can be made by one ordinary skilled in the art within the spirit and scope of the present disclosure.

Therefore, the disclosed subject matter should not be limited to any single embodiment described herein, and the scope of the present disclosure shall be determined according to the attached claims.

What is claimed is:

1. A biometric information detecting device comprising:
a plurality of sensors measuring biometric information of a user, a first sensor of the plurality of sensors outputting an electrical signal;
a signal generator connected to the plurality of sensors, wherein the signal generator receives the electrical signal corresponding to a first waveform from the first sensor at a first time point, firstly processes the electrical signal corresponding to the first waveform according to a first reference condition to output a first result signal for the electrical signal corresponding to the first waveform, and secondarily processes the electrical signal corresponding to the first waveform according to a second reference condition different from the first reference condition to output a second result signal for the electrical signal corresponding to the first waveform, the electrical signal being a single input signal that is converted to both the first result signal and the second result signal;
a controller controlling the signal generator to process the single input signal according to a first electrical signal range and a second electrical signal range in the first reference condition and the second reference condition, respectively, wherein the first electrical signal range and the second electrical signal range are for the single input signal, the second electrical signal range corresponds to a dryer finger of the user than the first electrical signal range, and wherein the second electrical signal range is narrower than the first electrical signal range and included in the first electrical signal range; and
a processor connected to the signal generator,
wherein the processor receives the first result signal for the electrical signal and the second result signal for the electrical signal from the signal generator, synthesizes the first result signal and the second result signal to calculate a final result signal, and generates the biometric information of the user based on the final result signal.

2. The biometric information detecting device of claim 1, wherein the signal generator comprises an analog-to-digital converter that converts the electrical signal in an analog form to a digital signal based on a predetermined reference range.

3. The biometric information detecting device of claim 2, wherein the analog-to-digital converter converts the electrical signal to the first result signal in a digital form based on the first electrical signal range when the analog-to-digital converter is operated in the first reference condition and converts the electrical signal to the second result signal in a digital form based on the second electrical signal range when the analog-to-digital converter is operated in the second reference condition.

4. The biometric information detecting device of claim 3, wherein the controller outputs a first reference signal to the analog-to-digital converter to set the reference range of the analog-to-digital converter to the first electrical signal range and outputs a second reference signal to the analog-to-digital converter to set the reference range of the analog-to-digital converter to the second electrical signal range.

5. The biometric information detecting device of claim 3, wherein the first electrical signal range is defined between a first reference voltage and a second reference voltage, the second electrical signal range is defined between a third reference voltage and a fourth reference voltage.

6. The biometric information detecting device of claim 5, wherein the third reference voltage is smaller than or equal to the first reference voltage, and the fourth reference voltage is greater than the second reference voltage.

7. The biometric information detecting device of claim 2, wherein the analog-to-digital converter comprises:
a first analog-to-digital converter operated in the first reference condition to convert the electrical signal to the first result signal in a digital form according to the first electrical signal range; and
a second analog-to-digital converter operated in the second reference condition to convert the electrical signal to the second result signal in a digital form according to the second electrical signal range.

8. The biometric information detecting device of claim 7, wherein the controller outputs a first reference signal to the first analog-to-digital converter to allow the first analog-to-digital converter to be operated in the first reference condition and outputs a second reference signal to the second analog-to-digital converter to allow the second analog-to-digital converter to be operated in the second reference condition.

9. The biometric information detecting device of claim 2, wherein the signal generator further comprises an amplifier that amplifies the electrical signal output from the first sensor to output an amplified signal.

10. The biometric information detecting device of claim 9, wherein the amplifier amplifies the electrical signal according to a first predetermined gain when operated in the first reference condition to output a first amplified signal and amplifies the electrical signal according to a second predetermined gain when operated in the second reference condition to output a second amplified signal.

11. The biometric information detecting device of claim 10, wherein the controller applies a control signal to the amplifier such that the amplifier amplifies the electrical signal based on different gains from each other according to the first and second reference conditions.

12. The biometric information detecting device of claim 10, wherein the second predetermined gain is greater than the first predetermined gain.

13. The biometric information detecting device of claim 10, wherein the analog-to-digital converter converts the first amplified signal to the first result signal in a digital form according to the reference range on the first reference condition and converts the second amplified signal to the second result signal in a digital form according to the reference range on the second reference condition.

14. The biometric information detecting device of claim 1, wherein the processor comprises:
a synthesizer synthesizing the first result signal and the second result signal to output the final result signal; and
an image processor receiving the final result signal from the synthesizer and generating the biometric information of the user based on the final result signal.

15. The biometric information detecting device of claim 14, wherein the synthesizer applies different weights to the first and second result signals and sums the first and second result signals to generate the final result signal.

16. The biometric information detecting device of claim 14, wherein the synthesizer compares the first and second result signals and selects one of the first and second result signals as the final result signal when the first and second result signals are different from each other.

17. The biometric information detecting device of claim 1, wherein the first sensor receives a light reflected by the user's finger and outputs fingerprint information of the user as the electrical signal based on an amount of the reflected light.

18. A display apparatus comprising:
a display panel displaying an image; and
a biometric information detecting device recognizing biometric information of a user that is input through the display panel, the biometric information detecting device comprising:
a plurality of sensors measuring biometric information of the user, a first sensor of the plurality of sensors outputting an electrical signal;
a signal generator connected to the plurality of sensors, wherein the signal generator receives the electrical signal corresponding to a first waveform from the first sensor at a first time point, firstly processes the electrical signal corresponding to the first waveform according to a first reference condition to output a first result signal for the electrical signal corresponding to the first waveform, and secondarily processes the electrical signal corresponding to the first waveform according to a second reference condition different from the first reference condition to output a second result signal for the electrical signal corresponding to the first waveform, the electrical signal being a single input signal that is converted to both the first result signal and the second result signal;
a controller controlling the signal generator to process the single input signal according to a first electrical signal range and a second electrical signal range in the first reference condition and the second reference condition, respectively, wherein the first electrical signal range and the second electrical signal range are for the single input signal, the second electrical signal range corresponds to a dryer finger of the user than the first electrical signal range, and wherein the second electrical signal range is narrower than the first electrical signal range and included in the first electrical signal range; and
a processor connected to the signal generator,
wherein the processer receives the first result signal for the electrical signal and the second result signal for the electrical signal from the signal generator, synthesizes the first result signal and the second result signal to calculate a final result signal, and generates the biometric information of the user based on the final result signal.

19. The display apparatus of claim 18, wherein the biometric information detecting device comprises:
   a substrate disposed on a rear surface of the display panel displaying the image through a front surface;
   a sensing layer comprising the plurality of sensors arranged on the substrate in an array form; and
   a covering layer covering the sensing layer.

20. The display apparatus of claim 19, wherein the first sensor receives a light reflected by the user's finger and outputs fingerprint information of the user as the electrical signal based on an amount of the reflected light.

21. The display apparatus of claim 20, wherein the covering layer comprises a collimator layer to filter the light such that the plurality of sensors receive the light reflected by the user's finger.

22. The display apparatus of claim 18, wherein the display panel comprises a display area in which the image is displayed and a non-display area disposed adjacent to the display area, and the display area comprises a normal display area and a sensing area that senses the biometric information of the user using a light incident thereto.

23. The display apparatus of claim 22, wherein the display panel comprises:
   a display pixel disposed in the display area and comprising a light emitting layer to output a light; and
   a sensing pixel disposed in the sensing area to receive the light output from the light emitting layer and reflected by the user's finger as the biometric information.

24. The display apparatus of claim 18, wherein the processor applies different weights to the first and second result signals and sums the first and second result signals to generate the final result signal.

25. The display apparatus of claim 18, wherein the processor compares the first and second result signals and selects one of the first and second result signals as the final result signal when the first and second result signals are different from each other.

* * * * *